US005107284A

United States Patent [19]

Cyman et al.

[11] Patent Number: 5,107,284

[45] Date of Patent: Apr. 21, 1992

[54] NITROGEN ARGON MIXTURES SUPPLIED TO MIDAX PRINTERS

[75] Inventors: T. F. Cyman, Grand Island; Dennis C. Pollutro, Cherry Creek, both of N.Y.

[73] Assignee: Moore Business Forms, Inc., Grand Island, N.Y.

[21] Appl. No.: 530,846

[22] Filed: May 31, 1990

[51] Int. Cl.[5] .............. G01D 15/06

[52] U.S. Cl. .............. 346/159; 346/154

[58] Field of Search .............. 346/159, 154

[56] References Cited

U.S. PATENT DOCUMENTS

| | | | |
|---|---|---|---|
| 3,978,492 | 8/1976 | Simm | 346/74 |
| 3,979,759 | 9/1976 | Simm | 346/74 |
| 4,168,973 | 9/1979 | Simm et al. | 96/1 |
| 4,734,721 | 3/1988 | Boyer et al. | 346/159 |
| 4,864,331 | 9/1989 | Boyer et al. | 346/159 |
| 4,890,123 | 12/1989 | McCallum et al. | 346/159 |
| 4,918,468 | 4/1990 | Miekka et al. | 346/159 |

*Primary Examiner*—George H. Miller, Jr.
*Attorney, Agent, or Firm*—Nixon & Vanderhye

[57] ABSTRACT

A method and apparatus provide enhanced longevity of the ion cartridge in an MIDAX (silent electric discharge) electrostatic imaging processing system. The conventional ion cartridge comprises a solid dielectric with driver and control electrodes on opposite sides, the second electrode defining a discharge region at the junction of the edge surface of the solid dielectric member. Alternating current is supplied to the electrodes to induce charged particle production electrical discharges. Gas is supplied to the discharge region to replace the vast majority of the air during charge particle generation. The gas is a mixture consisting essentially of nitrogen with an amount of argon, neon, xeon, or krypton effective to provide a catalyst for nitrogen ionization while preventing arcing. Typically, the gas is a mixture of nitrogen and argon in a ratio of about 5 to 1 to about 20 to 1 (e.g. about 10 to 1), with the total gas flow rate to the discharge region about 4.75-6.25 cubic feet per hour. The gas is supplied to the area between the ion cartridge and an imaging drum by a pair of gas manifolds at opposite ends of the drum, and a pair of spray tubes having numerous perforations along their length extending between the gas manifolds. Regulators precisely control the amount of nitrogen and argon supplied to the gas manifolds.

19 Claims, 2 Drawing Sheets

*Fig. 4*
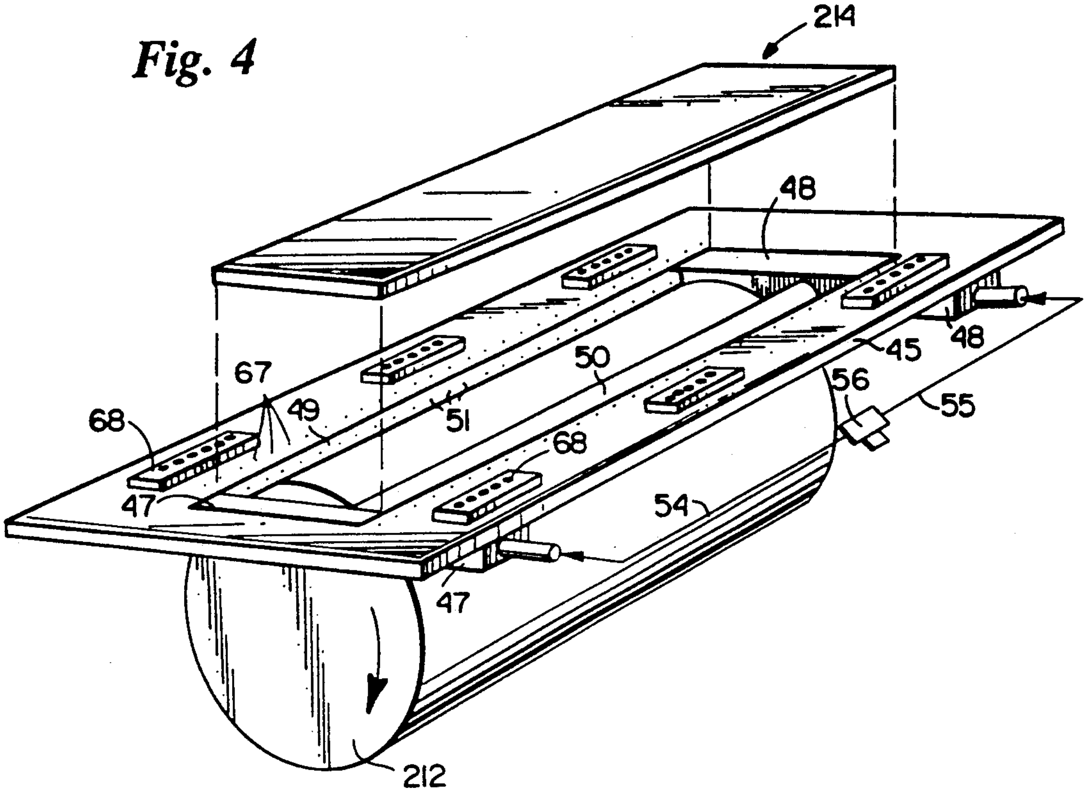
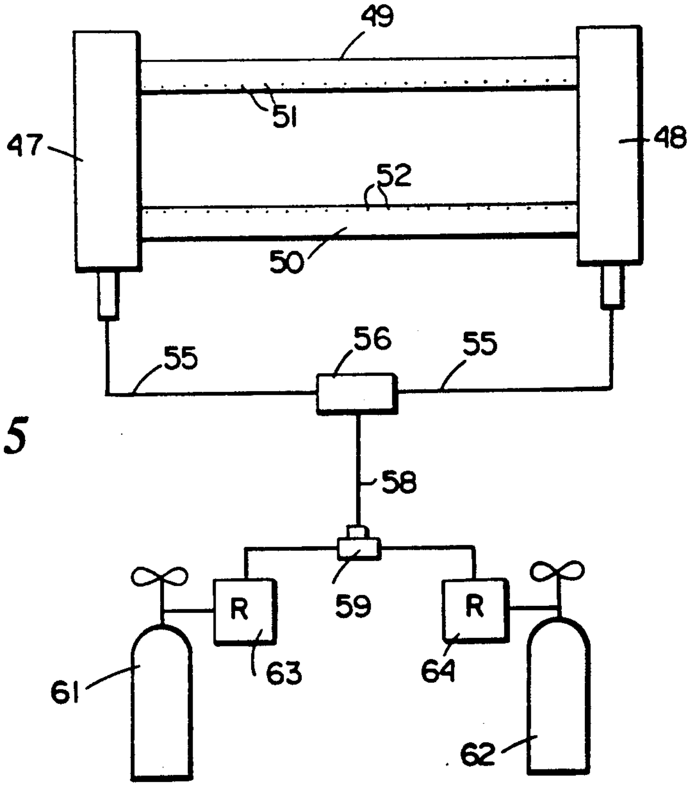
*Fig. 5*

NITROGEN ARGON MIXTURES SUPPLIED TO MIDAX PRINTERS

BACKGROUND AND SUMMARY OF THE INVENTION

IDAX and MIDAX printing techniques are commercial electrographic imaging techniques that utilize what is referred to as silent electric discharge. In such systems, an ion cartridge is mounted adjacent an imaging drum. The drum then moves into contact with a transfer sheet (e.g. paper). The conventional cartridges utilized in these printing systems include first and second electrodes, typically called the driver and control electrodes, separated by a solid dielectric member, such as a sheet of mica. The control electrode, typically in the form of control fingers, defines an edge surface disposed opposite the driver electrode to define a discharge region at the junction of the edge surface and the solid dielectric member. An alternating potential is applied between the driver and control electrodes of sufficient magnitude to induce charged particle producing electrical discharges in the discharge region, and means are provided for applying a charged particle extraction potential between the control electrode and a further electrode, so that imaging occurs on the imaging drum, or paper or like dielectric moving past the ion cartridge. In most commercial installations a screen electrode is also provided, between the imaging drum and the control electrode, and separated by an insulating spacer from the control electrode. A commercial ion cartridge is typically constructed of a plurality of driver, control, and screen electrode units, in a matrix form.

In commercial installations of MIDAX printers, there typically are three major manners in which the ion cartridges fail. The spot size produced by the ion cartridge grows as the cartridge ages, and once it gets to a particular level so that the print quality is unacceptably poor, the cartridge must be cleaned or retired; or under some circumstances there is catastrophic failure of the cartridge.

One conventional way in which ion cartridges fail is euphemistically referred to as "red death". By-products formed in the ionization process, such as oxides, build up on the cartridge control fingers which can cause an uneven rush of electrons and negative ions upon application of the extraction voltage. Another mode of failure is euphemistically referred to as "white death". In the white death scenario, white crystals, which typically are nitrates, build up on the screen electrode thereby creating a dielectric layer and causing an electrical defocussing of the electron and ion stream as it exits the cartridge. A third typical mode of failure, euphemistically referred to as "black death", is caused by premature catastrophic failure of the cartridge when conductive toner is sucked up into the cartridge and creates unwanted electrically conductive paths and also localized heating.

According to the invention it has been found that the mechanisms by which at least red and white death occur are dependent upon the characteristics of the atmosphere from which the ions are produced by the ion cartridge. The atmosphere is typically normal air, although it may be contaminated with ammonia, benzene, or other gases depending upon the particular plant in which the system is utilized. Nitrogen, oxygen, and water vapor are the major components of the atmosphere, and during operation of the MIDAX printers after one stream of electrons and ions is created and extracted from the cartridge new air replaces that which was lost from the cartridge. Most of the problems of ion cartridge aging are caused by compounds made of or initiated by oxygen and/or water vapor, and therefore the process can be slowed or even eliminated by the replacement of the air around the ion cartridge with appropriate other gases. Even in situations where ion cartridge life is not extended, however, there may be significant advantages to providing a particular atmosphere in the ion cartridges. For example the quality of the print—its uniformity—may be significantly enhanced. Uniformity enhancements on the order of 40% are not unusual when the atmosphere from which the electrons and ions are created by the ion cartridge is properly controlled.

According to the present invention, it has been found that if a substantial portion of the air at the discharge region of the ion cartridge is replaced with nitrogen, elemental noble gases, mixtures of noble gases, or mixtures of nitrogen with one or more noble gases, uniformity and/or cartridge life can be significantly enhanced. If the gas is supplied in a particular manner even black death catastrophic failure can be eliminated or minimized.

Gases that are particularly effective in the practice of the invention are nitrogen, mixtures of nitrogen and helium, and mixtures of nitrogen with argon, xenon, neon, and/or krypton. It has been found that completely dry pure nitrogen is not particularly effective since nitrogen is not easily ionized, and therefore there must be some "catalyst" present to enhance the nitrogen ionization. However the catalyst must be present in small enough amounts so that arcing does not occur, since arcing can be destructive and reduce cartridge life. While water vapor that naturally occurs can provide this catalyst effect, it is desirable for other reasons to keep the amount of water vapor to a minimum. Therefore it is most desirable to add another gas, such as a noble gas, to the nitrogen.

While helium can be effective as a catalyst for nitrogen ionization, if helium is used in a commercial environment it can be dangerous to a human operator since the helium and nitrogen ionization may generate gases that would make an operator dizzy. Argon, xenon, neon, and krypton do not have that effect, however, yet they provide an effective catalyst for nitrogen ionization. The amounts of argon, neon, krypton, or xenon must be controlled, however, to make sure that they are low enough so that arcing does not occur.

In the preferred form of the present invention, nitrogen is mixed with argon, xenon, neon, or krypton so that there is a volume ratio of about 5 - 1 to about 20 - 1 of nitrogen to other gas. The invention is most effective in some actual operating environments when nitrogen and argon are mixed at a ratio of about 10 to 1. Typically the gas mixture is supplied to the discharge region at a rate of about 4.75–6.25 cubic feet per hour, typically about 0.5 cubic feet per hour of argon, xenon, neon, or krypton, and about 5 cubic feet per hour nitrogen.

A number of particularly advantageous mechanisms for introducing the gas to the discharge region are provided according to the invention. Black death can be significantly reduced if the gas is introduced through the insulating spacer between the control electrode and the screen electrode. The gas is typically introduced at a pressure above atmospheric pressure so that a positive pressure is provided in this area, and conductive toner can therefore not be easily sucked into the ion cartridge. Alternatively, the gas may be injected through a plenum and holes spaced about one-half inch along a pre-existing cartridge mounting rail, typically the first rail in the direction of rotation of the imaging drum. Alternatively, a pair of gas manifolds may be provided at opposing ends of the imaging drum, and a pair of spray tubes extending between the gas manifolds with a plurality of openings provided along their length. The gas is then supplied by regulators and conduits to the gas manifolds, and thus introduced uniformly between the ion cartridge and the imaging drum.

According to one aspect of the invention, there is provided apparatus for generating charged particles for electrostatic imaging. The apparatus comprises: an imaging drum; an ion cartridge; a support between the image drum and the ion cartridge for supporting the ion cartridge; said ion cartridge comprising a solid dielectric member, a first electrode substantially in contact with one side of the solid dielectric member, a second electrode substantially in contact with the opposite side of the solid dielectric member with an edge of the second electrode disposed opposite the first electrode to define a discharge region at the junction of the edge surface and the solid dielectric member; means for applying potential between the first and second electrodes of sufficient magnitude to induce charged particle producing electrical discharges in the discharge region between the dielectric member and the edge surface of the second electrode and means for applying a charged particle extraction potential between the second electrode and a further electrode; a pair of gas manifolds at opposite ends of the drum; a pair of spray tubes, having numerous perforations along their length, extending between the gas manifolds, for supplying gas to the volume between the drum and the ion cartridge; and means for supplying a mixture consisting essentially of nitrogen gas, with an amount of argon, xeon, neon, or krypton effective to provide a catalyst for nitrogen ionization while preventing arcing, from the screen to the imaging drum.

According to another aspect of the invention, there is provided a method of generating charged particles for electrostatic imaging comprising the steps of: (a) applying an alternating potential between a first electrode substantially in contact with one side of a solid dielectric member and a second electrode substantially in contact with an opposite side of the solid dielectric member, said second electrode having an edge surface disposed opposite said first electrode to define a discharge region at the junction of the edge surface and the solid dielectric member, to induce charged particle producing electrical discharges in said air region between said solid dielectric member and the edge surface of said electrode; (b) applying a charged particle extraction potential between said second electrode and a further electrode member to extract charged particles produced by the electrical discharges in said air region; (c) applying the external charged particles to a further member to form an electrostatic image; and (d) supplying a gas to the discharge site to replace the vast majority of the air during charged particle generation, said gas being a mixture consisting essentially of the nitrogen, with an amount of argon, xeon, neon, or krypton effective to provide a catalyst for nitrogen ionization while preventing arcing. Step (d) is preferably practiced by providing the nitrogen and argon, xeon, neon, or krypton at a ratio of about 5 to 1 to about 20 to 1, e.g. by providing nitrogen and argon at a ratio of about 10 to 1.

It is the primary object of the present invention to provide for enhanced uniformity and/or enhanced cartridge life in silent electric discharge electrographic imaging. This and other objects of the invention will become clear from an inspection of the detailed description of the invention and from the appended claims.

BRIEF DESCRIPTION OF THE DRAWINGS

FIG. 4 is an exploded perspective schematic view of still another embodiment for the supply of gas to the discharge region, according to the invention; and FIG. 5 is a top schematic view of the apparatus of FIG. 4, also showing the gas sources and regulating apparatus.

DETAILED DESCRIPTION OF THE DRAWINGS

Figure 1:
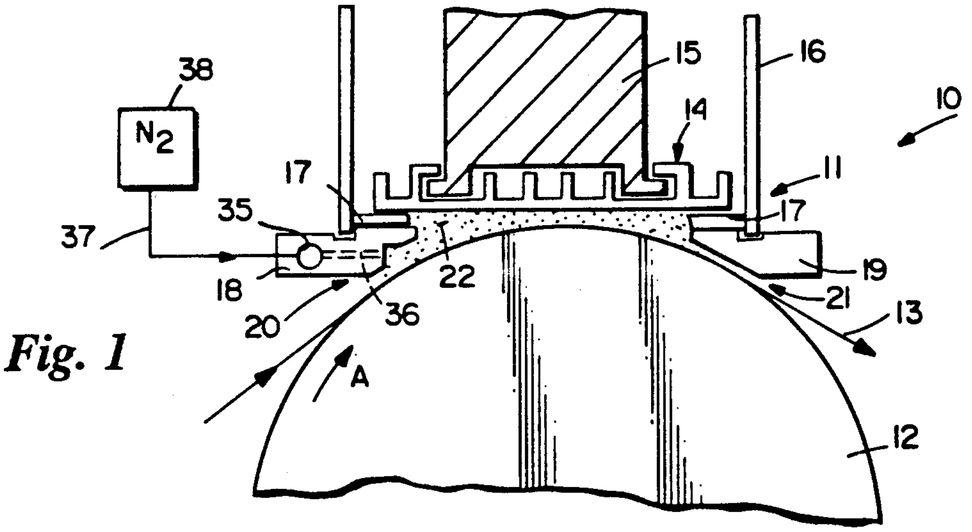
FIG. 1 is a side schematic view, partly in cross-section and partly in elevation of an apparatus for electrostatic imaging according to the present invention, and for practicing the method of the present invention.

An exemplary apparatus according to the present invention is shown generally by reference numeral 10 in FIG. 1. The main components include the silent electric discharge ion generating system 11, and an imaging drum 12 or like device for moving a dielectric, such as dielectric belt or dielectric paper web 13 or dielectric surface of drum 12, past the SED apparatus 11. Most of the components of the SED apparatus 11, and the imaging drum, are conventional.

One of the major components of the SED apparatus 11 comprises the ion cartridge 14 which is mounted by a cartridge mounting block 15 within a casing defined by driver printed circuit board 16 and cartridge connectors 17. The structures 16, 17 are supported by a pair of cartridge mounting rails 18, 19 that are elongated in the direction of elongation of the drum 12 and the ion cartridge 14. The drum 12 is mounted for rotation in the direction A by a shaft, bearings, and like conventional components, and so that it is spaced only a small distance from each of the rails 18, 19, defining gaps 20, 21 therewith. Typically the gaps 20, 21 have a width of less than about 0.002 inches. An interior volume 22 is provided between the ion cartridge 14 and the imaging drum 12.

Figure 2:
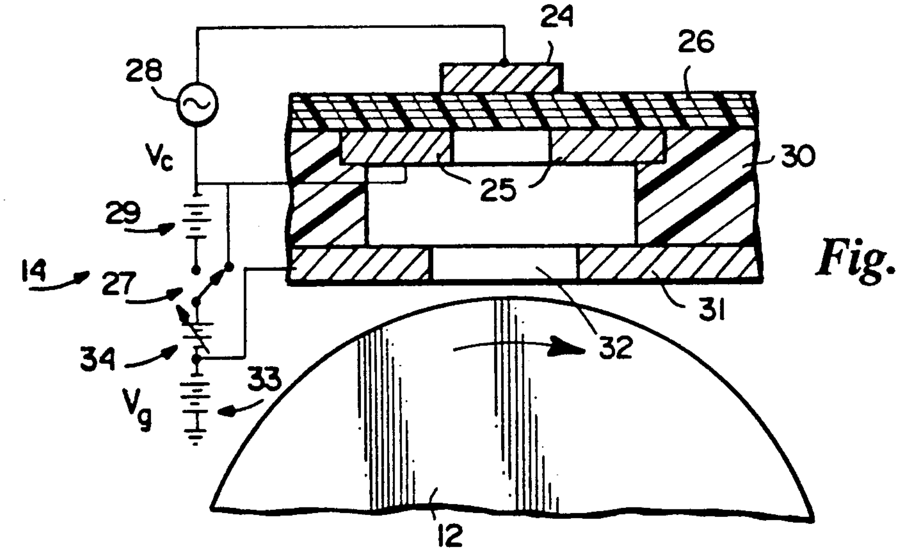
FIG. 2 is a side schematic primarily cross-sectional view of the details of the ion cartridge of the FIG. 1 apparatus.

The ion cartridge 14 is of conventional construction, such as shown in U.S. Pat. Nos. 4,155,093, 4,160,257, 4,267,556, and/or 4,381,327. FIG. 2 very schematically illustrates one component of the ion cartridge 14, there being many such components arranged throughout the length of the ion cartridge 14 (typically in matrix form) to provide electrostatic charges to the dielectric web or belt 13. The major components of the cartridge 14 schematically illustrated in FIG. 2 comprise a first or driver electrode 24, a second or control electrode 25 typically formed by a plurality of control fingers, and a solid dielectric member 26 disposed therebetween. Typically the member 26 is mica in commercial installations, however according to the invention improved performance and longevity are possible so that other solid dielectric members besides mica may be practical.

A high voltage alternating potential 28 is applied between the driver and control electrodes 24, 25 to cause the formation of a pool or plasma of positive and negative charged particles in the region adjacent the dielectric 26 at an edge surface of the control electrode 25, which charged particles may be extracted to form a latent electrostatic image on the dielectric belt or web 13 or drum 12 periphery. Charged particles of a given polarity may be extracted from the plasma by applying a bias potential 29 of appropriate polarity between the second electrode 25 and a further electrode, which typically would comprise the image drum 12 itself. Also in most commercial installations, a screen electrode 31 defining a screen aperture 32 is provided by an electrical insulator 30 from the second electrode 25. The screen voltage should be in a relatively narrow range, e.g. −400 to −900. The screen voltage is determined in part by the distance of the screen 31 from the drum 12. At a distance of 0.0010 inches, the optimum screen voltage is about −700, and could be increased to about −800 before arcing occurs.

As seen in FIG. 2, constant power supply 33 (typically a voltage of about −700) and variable power supply 34, and a switch 27, are provided in addition to power supply 29 (typically a voltage of about −275). The power supply 34 typically has a range of about +200 to about +300 (e.g. about +250). When switch 27 is in the right (no-print) position in FIG. 2, the power supply 29 is bypassed, and there is a voltage of about −450 to the control electrode 25 (e.g. −700+ +250= −450). When the switch 27 is in the left position in FIG. 2, that is the print position, there is about a −725 voltage to control electrode 25 (e.g. −700+ +250+ −275= −725). The screen electrode 31 provides an electrostatic lensing action preventing accidental image erasure and focussing of the electrostatic discharge onto the drum 12 periphery. In most commercial installations, a dielectric belt or web 13 need not pass past the ion cartridge 14, but rather the peripheral surface of the imaging drum 12 is dielectric, and that surface moves into operative association with a receptor sheet, such as a paper sheet, which cooperates with a transfer roll.

What has been heretofore described is conventional. According to the invention, at least some of, and preferably the vast majority of, the gas in the volume 22 (i.e. at the discharge region of the control electrode 25) is replaced with gas having particular qualities so as to enhance the uniformity of the print quality, and/or to extend the life of the ion cartridge 14.

The apparatus according to the present invention comprises means for supplying a control gas to the discharge region during the generation of charged particles. The control gas—which in the FIG. 1 embodiment is supplied directly to the volume 22—comprises a gas selected from the group consisting essentially of nitrogen, elemental noble gases, mixtures of elemental noble gases, and mixtures of nitrogen with one or more elemental noble gases. It is not essential that all contaminants be removed from the gases, and in fact where pure nitrogen is utilized it is necessary that water vapor, or some other catalyst to facilitate nitrogen ionization, be present in order for the system to work properly. However it has been found that almost 100% pure nitrogen supplied as illustrated in FIG. 1, or in a like manner, combined with the natural water vapor from the paper or other components introduced into the system, works satisfactory to at least enhance print uniformity. Nitrogen mixed with helium is also effective, however in commercial installations where an operator will be located adjacent to the printing apparatus 10 helium is not desirable since by-product gases are produced which can have undesirable side effects when inhaled, and thereby pose a safety hazard. It has been found that it is particularly desirable, however, to provide a particular mixture of nitrogen with one or more of argon, krypton, xenon, or neon, most preferably argon.

According to the invention it has been determined that the amount of noble gas to be mixed with nitrogen (when a nitrogen noble gas mixture is utilized) should be enough to provide a catalyst for nitrogen ionization. However since elemental noble gas present in too large a quantity will cause arcing to occur, the amount of noble gas must be limited by that criteria. In actual experiments it has been found that a mixture of nitrogen and one or more of argon, krypton, xenon, or neon gases—particularly argon—is most suitable, the volume ratio of nitrogen to other gas being in the range of 5 to 1 to 20 to 1, most desirably about 10 to 1. The flows of the gases making up the mixture are controlled so that the total gas mixture flow to the discharge region is at a rate of about 4.75–6.25 cubic feet per hour, most typically by supplying nitrogen at about 5 cubic feet per hour and the other gas, e.g. argon, at about 0.5 cubic feet per hour.

Supply of gas to the volume 22 in the FIG. 1 embodiment is provided by utilizing the pre-existing cartridge mounting rail 18 at the "first" portion of the imaging drum 12 as it rotates in direction A into the volume 22, so that gas passes with the rotating drum toward the gap 21. This is preferably provided by forming a plenum 35 in the rail 18, with a plurality of through-extending openings or jets 36 from the plenum 35 to the volume 22, preferably the openings or jets 36 being spaced from each other about one half inch along the length of the rail 18. A conduit 37 leading from a source 38 of pressurized nitrogen, or other gas pursuant to the invention, supplies the controlled gas to the plenum 35. The source 38 can be either compressed nitrogen or like gas, or a liquid nitrogen dewer, or a Prima Alpha Separated nitrogen filter attached to a compressed air source.

With the proper control of gas to the volume 22, the apparatus 10 of FIG. 1 can greatly assist in extending the life of the ion cartridge. That is the avoidance of red death and white death may be provided. However a small amount of air, and other materials, may still pass into the volume 22, and therefore it is possible that conductive toner particles may accidentally be drawn into the volume 22, which conductive toner would burn and result in premature catastrophic failure of the cartridge 14. In order to prevent this "black death", the apparatus illustrated in FIG. 3 may be utilized.

Figure 3:
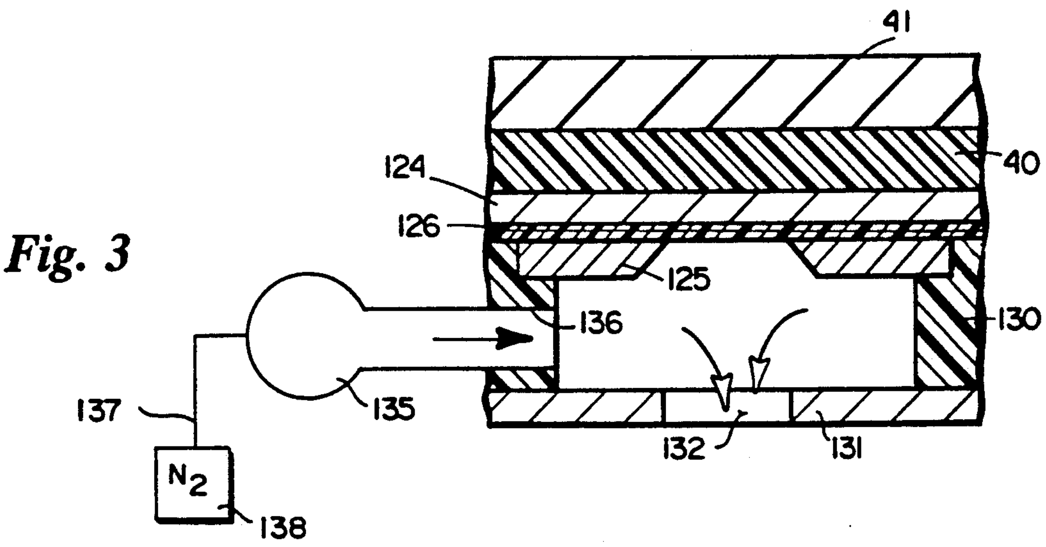
FIG. 3 is a detail schematic cross-sectional view of another embodiment of apparatus for feeding gas to the ion discharge region of apparatus according to the invention.

In the FIG. 3 drawing, elements that are comparable to those in the FIGS. 1 and 2 embodiment are illustrated by the same reference numeral only preceded by a "1".

In FIG. 3, the first or driver electrode 124 is shown mounted on a conventional backing insulator 40, which in turn is connected to an aluminum backbone 41. The mica dielectric member 126 is disposed between the driver electrode 124 and the control electrode fingers 125, with an insulating spacer 130 separating the screen electrode 131 from the control fingers 125. In this embodiment, the nitrogen or like gas under pressure (that is greater than ambient pressure) is introduced into the discharge region through the insulating spacer 130, having a vector generally parallel to the control fingers 125, by the openings or jets 136 connected to the plenum 135. The gas for ionization at the discharge region flows outwardly through the opening 132 in the screen electrode 131, along with the ions, and since a positive pressure is maintained at the discharge region it is extremely unlikely that conductive toner particles could enter that area and thereby cause "black death".

The embodiment of FIGS. 4 and 5 is still another embodiment of the apparatus for supplying the desired gases to the discharge region, according to the invention. In the FIGS. 4 and 5 embodiment, structures comparable to those in the FIGS. 1 and 2 embodiment are illustrated by the same reference numeral only preceded by a "2". In this embodiment, the ion cartridge 214 is shown in operative association with a support 45, which provides a positive electrical connection, adjacent the image drum 212. Gas is supplied via the gas manifolds 47, 48 which are mounted on opporegion ends of the cartridge 214 and drum 212. A pair of spray tubes 49, 50 having a plurality of openings 51, 52 respectively therein extend between the manifolds 47, 48 and supply gas directly to the "top" of the drum 212 (as oriented in FIG. 4), and just below the ion cartridge 214, to provide the vast majority of the gas at the discharge region.

Gas is supplied to the manifolds 47, 48 by conduits 54, 55 which are connected to a tee fitting 56, which in turn is connected by conduit 58 to a second tee fitting 59 (see FIG. 5). In the preferred embodiment illustrated herein, a source of nitrogen under pressure, 61, and a source of argon under pressure, 62, are provided to supply the ionizing gas. The sources 61, 62 are connected by conventional regulators and metering devices 63, 64 to the tee fitting 59. The regulator/metering devices 63, 64 control the flow rates of nitrogen and argon (or xenon, krypton, or neon) so that they are in the appropriate range.

The board 45 may have spring loaded pins 67 for engaging 214, and electrical connectors 68 for the drive electrode of the ion cartridge.

In the preferred embodiment, the ratio of nitrogen to argon (or xenon, krypton, or neon) is about 5 to 1 to 20 to 1, most preferably about 10 to 1. The flow rate is regulated so that the gas mixture supplied to the region by the tubes 49, 50 is (for the FIGS. 4 and 5 embodiment of apparatus) at a rate of about 4.75–6.25 cubic feet per hour. This rate may change depending upon the particulars of the geometry for applying the gas to the discharge region, but would be at an equivalent range taking into account the differences in the supply apparatus. Most desirably, the nitrogen would be supplied at about 5 cubic feet per hour while the argon (or xenon, neon, or krypton) at a rate of about 0.5 cubic feet per hour. The nitrogen flow rate could vary about plus or minus 10%, and the argon flow rate could vary about plus or minus 50%. It is necessary, however, that the amount of argon, or like gas, be supplied to the nitrogen stream so as to be effective to provide a catalyst for nitrogen ionization; however the amount must be low enough to prevent arcing since arcing more readily occurs the higher the percentage of argon or the like.

Utilizing the ratios heretofore described it is possible in an actual commercial installation of a MIDAX printer to increase the cartridge life between two and five times (i.e. with respect to red and white death). At ratios significantly outside this range, for the supply apparatus illustrated in FIGS. 4 and 5, the same results cannot be expected.

Reference is made to the following non-limiting examples which show some of the results achievable according to the invention:

EXAMPLE 1

Utilizing an apparatus generally similar to that in FIG. 1, so that the volume surrounding a conventional MIDAX ion cartridge associated with an imaging drum is shrouded, approximately 100% nitrogen gas was supplied to the volume 22. In actual operation of the system 10, the uniformity of the hole to hole ion cartridge output increased approximately 40%. Sufficient water vapor or like components were able to enter the system so as to provide a catalyst for the nitrogen ionization.

EXAMPLE 2

Again utilizing the apparatus generally such as illustrated in FIG. 1, a mixture of about 4:1, nitrogen to helium, by volume, was added to the volume 22. Again the print quality uniformity was significantly enhanced. While sufficient testing was not done to know for positive whether or not the ion cartridge life was extended in its real life environment, extrapolation of the results indicated that it clearly would be.

EXAMPLE 3

Utilizing apparatus as illustrated generally in FIGS. 4 and 5, about 5 cubic feet per hour of nitrogen and about 0.5 cubic feet per hour of argon were mixed in tee fitting 59 and in the subsequent conduits, being supplied in controlled quantities by regulators 63, 64, and were introduced through the spray tubes 49, 50. In an actual commercial plant environment, the life of the MIDAX ion cartridge 214 was extended to approximately four times its expected longevity. If the argon concentration was reduced below a volume ratio of about 20 to 1, there was insufficient argon to provide a catalyst for ionization and poor and/or intermittent ionization will take place, resulting in poor print quality. When the amount of argon is increased above about 5 to 1, in its real life testing there was too high a potential of arcing to expect the type of longevity desired.

It is also noted that in the MIDAX control system, control of internal operating voltages may be effected from an operator control panel (not shown). Thus in the practice of the invention, if the operator notices that the print quality is degrading, he can increase the voltage to ion cartridge 14, and operate the regulators 63, 64 to close of the cylinders 61, 62. While good quality printing (due to the increased voltage) continues, he can then replace the gas bottles 61, 62, and once he reestablishes the gas supply utilizing regulators 63, 64, he can then reduce the voltage back to normal. In this way the system can be continuously run without a degradation in print quality while changeover of gas supplies takes place.

It will thus be seen that according to the present invention enhanced print uniformity and/or ion cartridge longevity for a MIDAX printer can be achieved by supplying the desired gas at the discharge region. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A method of generating charged particles for electrostatic imaging comprising the steps of (a) applying an alternating potential between a first electrode substantially in contact with one side of a solid dielectric member and a second electrode substantially in contact with an opposite side of the solid dielectric member, said second electrode having an edge surface disposed opposite said first electrode to define a discharge region at the junction of the edge surface and the solid dielectric member, to induce charged particle producing electrical discharges in said air region between said solid dielectric member and the edge surface of said electrode;

(b) applying a charged particle extraction potential between said second electrode and a further electrode member to extract charged particles produced by the electrical discharges in said air region;

(c) applying the external charged particles to a further member to form an electrostatic image; and (d) supplying a gas to the discharge site to replace the vast majority of the air during charged particle generation, said gas being a mixture consisting essentially of nitrogen, with an amount of argon, xeon, neon, or krypton effective to provide a catalyst for nitrogen ionization while preventing arcing.

2. A method as recited in claim 1 wherein step (d) is practiced by providing the nitrogen and argon, xeon, neon, or krypton at a ratio of about 5 to 1 to about 20 to 1.

3. A method as recited in claim 2 wherein step (d) is practiced by providing the nitrogen and argon at a ratio of about 10 to 1.

4. A method as recited in claim 3 wherein step (d) is practiced by supplying the gas mixture to the discharge site at a rate of about 4.75-6.25 cubic feet per hour.

5. A method as recited in claim 1 wherein step (d) is practiced by supplying nitrogen at about 5 cubic feet per hour and xeon, argon, neon or krypton at a rate of about 0.5 cubic feet per hour.

6. A method as recited in claim 1 wherein step (d) is practiced by supplying the gas mixture to the discharge site at a rate of about 4.75-6.25 cubic feet per hour.

7. A method as recited in claim 1 utilizing an image drum, an ion cartridge, a support between the image drum and ion cartridge, a gas manifold at opposite ends of the drum, and a pair of spray tubes, having numerous perforations along their length, extending between the gas manifolds; and wherein step (d) is practiced by supplying the gas to the gas manifolds, to be ultimately supplied by the spray tubes to the volume between the ion cartridge and the drum.

8. A method as recited in claim 7 wherein step (d) is practiced by supplying the gas mixture to the discharge site at a rate of about 4.75-6.25 cubic feet per hour.

9. A method as recited in claim 7 wherein step (d) is practiced by supplying nitrogen at about 5 cubic feet per hour and xeon, argon, neon, or krypton at a rate of about 0.5 cubic feet per hour.

10. A method as recited in claim 7 wherein step (d) is practiced by providing the nitrogen and argon, xeon, neon, or krypton at a ratio of about 5 to 1 to about 20 to 1.

11. Apparatus for generating charged particles for electrostatic imaging comprising:

an imaging drum;

an ion cartridge;

a support between the image drum and the ion cartridge for supporting the ion cartridge;

said ion cartridge comprising a solid dielectric member, a first electrode substantially in contact with one side of the solid dielectric member, a second electrode substantially in contact with the opposite side of the solid dielectric member with an edge of the second electrode disposed opposite the first electrode to define a discharge region at the junction of the edge surface and the solid dielectric member;

means for applying potential between the first and second electrodes of sufficient magnitude to induce charged particle producing electrical discharges in the discharge region between the dielectric member and the edge surface of the second electrode and means for applying a charged particle extraction potential between the second electrode and a further electrode;

a pair of gas manifolds at opposite ends of the drum;

a pair of spray tubes, having numerous perforations along their length, extending between the gas manifolds, for supplying gas to the volume between the drum and the ion cartridge; and means for supplying a mixture consisting essentially of nitrogen gas, with an amount of argon, xeon, neon, or krypton effective to provide a catalyst for nitrogen ionization while preventing arcing, to the gas manifolds.

12. Apparatus as recited in claim 11 wherein said means for supplying gas to the gas manifolds comprises regulating and metering means for regulating the flow of nitrogen on the one hand and argon, xeon, neon, or krypton on the other hand, so that the mixture of gases supplied to the gas manifold comprises a ratio of about 5 to 1 to about 20 to 1 nitrogen to other gas.

13. Apparatus as recited in claim 12 wherein said ion cartridge further comprises a screen electrode between said second electrode and said imaging drum, and spaced by an insulating spacer from said second electrode.

14. Apparatus as recited in claim 13 wherein the means for supplying gas comprises a source of nitrogen under pressure and a source of argon under pressure, and wherein said regulating and metering means comprises means for regulating the flow of nitrogen and argon so that the mixture supplied to the gas manifolds is at a ratio of about 10 to 1 nitrogen to argon.

15. Apparatus as recited in claim 14 wherein said regulating and metering means comprises means for supplying the gas mixture to the discharge region at a rate of about 4.75-6.25 cubic feet per hour.

16. Apparatus as recited in claim 12 wherein said regulating and metering means-comprises means for supplying nitrogen at about 5 cubic feet per hour, and xeon, argon, neon, or krypton at a rate of about 0.5 cubic feet per hour, as a mixture to the gas manifolds.

17. Apparatus as recited in claim 12 wherein said gas supply means comprises regulating and metering means, and a source of nitrogen under pressure, a source of xeon, argon, neon, or krypton gas under pressure, a regulator associated with each gas source, first and second T connectors, the first connector operatively connected to the regulators and to the second T connector, and the second T connector operatively connected to the gas manifolds.

18. Apparatus as recited in claim 17 wherein said ion cartridge further comprises a screen electrode between said second electrode and said imaging drum, and spaced by an insulating spacer from said second electrode.

19. Apparatus as recited in claim 12 wherein said ion cartridge further comprises a screen electrode between said second electrode and said imaging drum, and spaced by an insulating spacer from said second electrode.

* * * * *